US009691121B1

(12) United States Patent
Ferreyra

(10) Patent No.: US 9,691,121 B1
(45) Date of Patent: Jun. 27, 2017

(54) DISTRIBUTED DETERMINATION OF SCENE INFORMATION

(71) Applicant: Amazon Technologies, Inc., Seattle, WA (US)

(72) Inventor: Juan Pablo Ferreyra, Lake Forest, CA (US)

(73) Assignee: Amazon Technologies, Inc., Seattle, WA (US)

(*) Notice: Subject to any disclaimer, the term of this patent is extended or adjusted under 35 U.S.C. 154(b) by 253 days.

(21) Appl. No.: 14/538,024

(22) Filed: Nov. 11, 2014

(51) Int. Cl.
*G06T 1/20* (2006.01)
*G06T 1/60* (2006.01)
*G06T 15/60* (2006.01)

(52) U.S. Cl.
CPC .......... *G06T 1/20* (2013.01); *G06T 1/60* (2013.01); *G06T 15/60* (2013.01)

(58) Field of Classification Search
CPC .. G06F 11/0709; A63F 13/12; A63F 2300/66; A63F 2300/538; A63F 13/352; A63F 13/358; A63F 13/52; A63F 13/79; A63F 2300/50; A63F 2300/513; G06T 15/005; G06T 2200/16; G06T 15/00; G06T 19/00; G06T 2210/08; G06T 11/00; G06N 3/006; G09G 2354/00
See application file for complete search history.

(56) References Cited

U.S. PATENT DOCUMENTS

| 2004/0207623 | A1* | 10/2004 | Isard | G06T 15/04 345/426 |
| 2013/0335434 | A1* | 12/2013 | Wang | G06N 99/005 345/581 |
| 2014/0082532 | A1* | 3/2014 | Sheppard | A63F 13/10 715/762 |
| 2014/0267271 | A1* | 9/2014 | Billeter | G06T 15/005 345/426 |
| 2014/0313200 | A1* | 10/2014 | Tokuyoshi | G06T 15/506 345/426 |
| 2014/0375659 | A1* | 12/2014 | McGuire | G09G 5/363 345/520 |

* cited by examiner

*Primary Examiner* — Haixia Du
(74) *Attorney, Agent, or Firm* — Baker & Hostetler LLP

(57) ABSTRACT

Techniques for distributed determination of scene information are described herein. Scene information may include, for example, information associated with geometries, lighting, colors, texture, shading, shadows, audio, camera attributes, and other information associated with a scene. A first portion of scene information may, for example, be determined by one or more first components, while a second portion of scene information may, for example, be determined by one or more second components. In some cases, at least part of the first portion of scene information may be provided from the one or more first components to the one or more second components. The one or more second components may use the at least part of the first portion of scene information in combination with at least part of the second portion of scene information to generate at least part of a resulting image and/or resulting audio associated with the scene.

20 Claims, 6 Drawing Sheets

DISTRIBUTED DETERMINATION OF SCENE INFORMATION

BACKGROUND

As the powers and capabilities of computers continue to expand, the widespread use and popularity of content items, such as video games, also continue to rapidly increase. As an example, modern video games may often include highly complex scenes with highly detailed and complicated objects, such as characters, weapons, vehicles, clouds, forests, and water. Additionally, scenes within modern video games may often have a number of associated light sources that interact with these objects at, for example, different angles, distances, and intensities. Also, in some cases, light may be obstructed by various objects, thereby causing shadows to be displayed on various surfaces of the objects. While these and other characteristics of video games are often highly attractive to video game consumers, they may often require large amounts of computing resources in order to be generated for presentation. Some computing systems may sometimes be unable to provide the necessary resources or may be forced to divert resources from other important operations.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Techniques for distributed determination of scene information are described herein. Scene information may include, for example, information associated with geometries, lighting, colors, texture, shading, shadows, audio, camera attributes, and other information associated with a scene. A first portion of scene information may, for example, be determined by one or more first components, while a second portion of scene information may, for example, be determined by one or more second components. In some cases, at least part of the first portion of scene information may be provided from the one or more first components to the one or more second components. The one or more second components may use at least part of the first portion of scene information in combination with at least part of the second portion of scene information to generate at least part of a resulting image and/or resulting audio associated with the scene.

In some cases, the one or more first components may be server components, while the one or more second components may be client components. Additionally, in some cases, the first portion of scene information may be determined prior to an execution of a content item, while the second portion of scene information may be determined during the execution of the content item. Also, in some cases, the first portion of scene information may be determined based on characteristics of the scene that are not dependent upon user input, while the second portion of scene information may be determined based on characteristics of the scene that are at least partially dependent upon user input.

Figure 1:
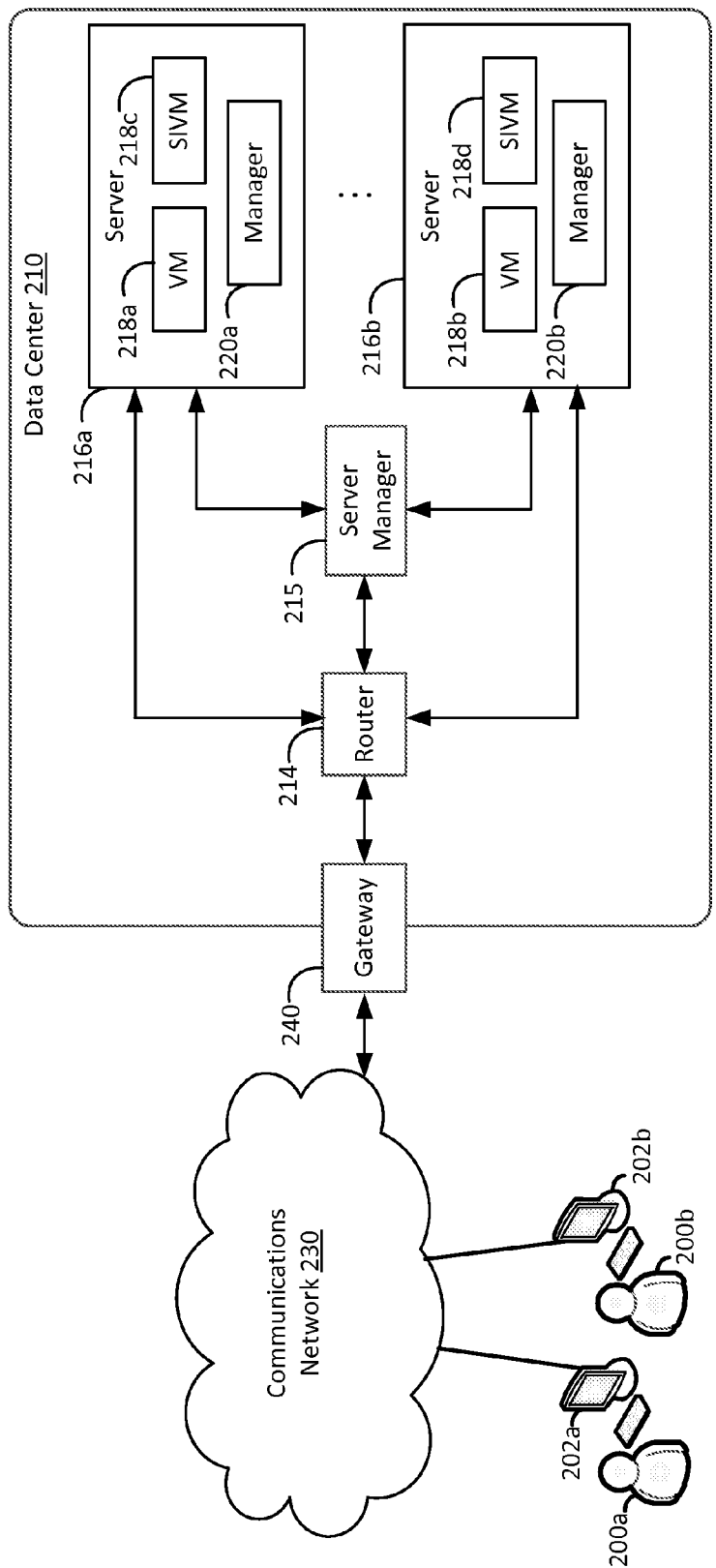
FIG. 1 is a diagram illustrating a first example computing system that may be used in accordance with the present disclosure.

An information provider may, in some cases, transmit information to clients over an electronic network, such as the Internet. An example computing environment that enables transmission of information to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or an as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a and 216b (which may be referred herein singularly as server 216 or in the plural as servers 216) that provide computing resources. These resources may be available as bare metal resources or as virtual machine instances 218a-d (which may be referred herein singularly as virtual machine instance 218 or in the plural as virtual machine instances 218). Virtual machine instances 218c and 218d are scene information virtual machine (SIVM) instances. The SIVM virtual machine instances 218c and 218d may be configured to perform all or any portion of the scene information determination techniques and/or any other of the disclosed techniques in accordance with the present disclosure and described in detail below. As should be appreciated, while the particular example illustrated in FIG. 1 includes one SIVM virtual machine in each server, this is merely an example. A server may include more than one SIVM virtual machine or may not include any SIVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway 240 or web interface (not shown) through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216a and 216b. Router 214 may also be connected to gateway 240, which is connected to communications network 230. Router 214 may be connected to one or more load balancers, and alone or in combination may manage communications within networks in data center 210, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216a and 216b. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors, such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality; including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
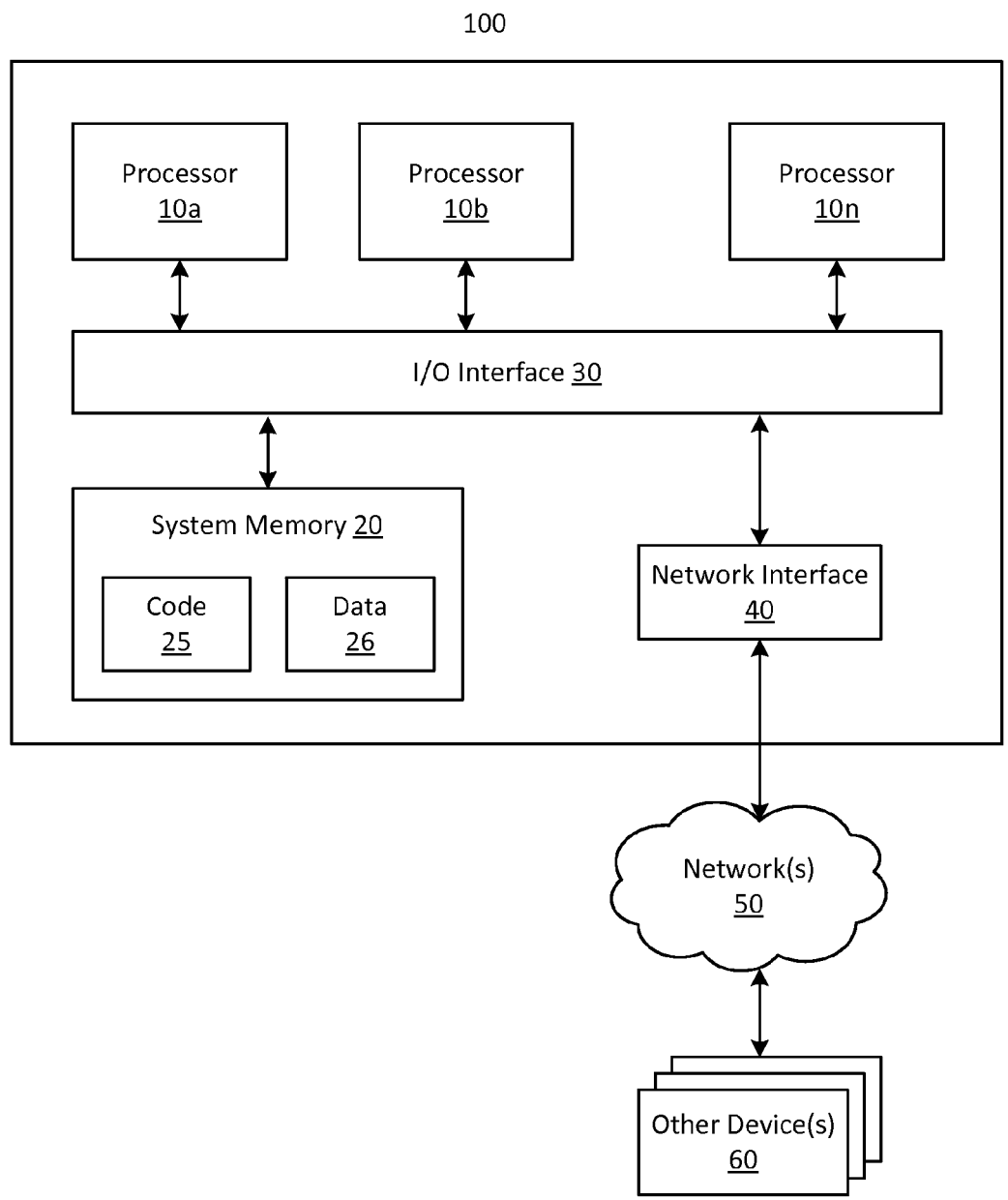
FIG. 2 is a diagram illustrating a second example computing system that may be used in accordance with the present disclosure.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10a, 10b and/or 10n (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks, such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 100 via I/O interface 30. A non-transitory computer-accessible storage medium may also include any volatile or non-volatile media, such as RAM (e.g., SDRAM, DDR SDRAM, RDRAM, SRAM, etc.), read only memory (ROM) etc., that may be included in some embodiments of computing device 100 as system memory 20 or another type of memory. Further, a computer-accessible medium may include transmission media or signals, such as electrical, electromagnetic or digital signals conveyed via a communication medium, such as a network and/or a wireless link, such as those that may be implemented via network interface 40. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters, and computing appliances. Any of these computing devices or environments may, for convenience, be described as compute nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided with direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

As set forth above, information may be provided by an information provider to one or more clients. An information provider may, for example, make available one or more information providing services for providing information to clients. The information providing services may reside on one or more servers. The information providing services may be scalable to meet the demands of one or more customers and may increase or decrease in capability based on the number and type of incoming client requests. Portions of information providing services may also be migrated to be placed in positions of reduced latency with requesting clients. For example, the information provider may determine an "edge" of a system or network associated with information providing services that is physically and/or logically closest to a particular client. The information provider may then, for example, "spin-up," migrate resources, or otherwise employ components associated with the determined edge for interacting with the particular client. Such an edge determination process may, in some cases, provide an efficient technique for identifying and employing components that are well-suited to interact with a particular client, and may, in some embodiments, reduce the latency for communications between an information provider and one or more clients.

Figure 3:
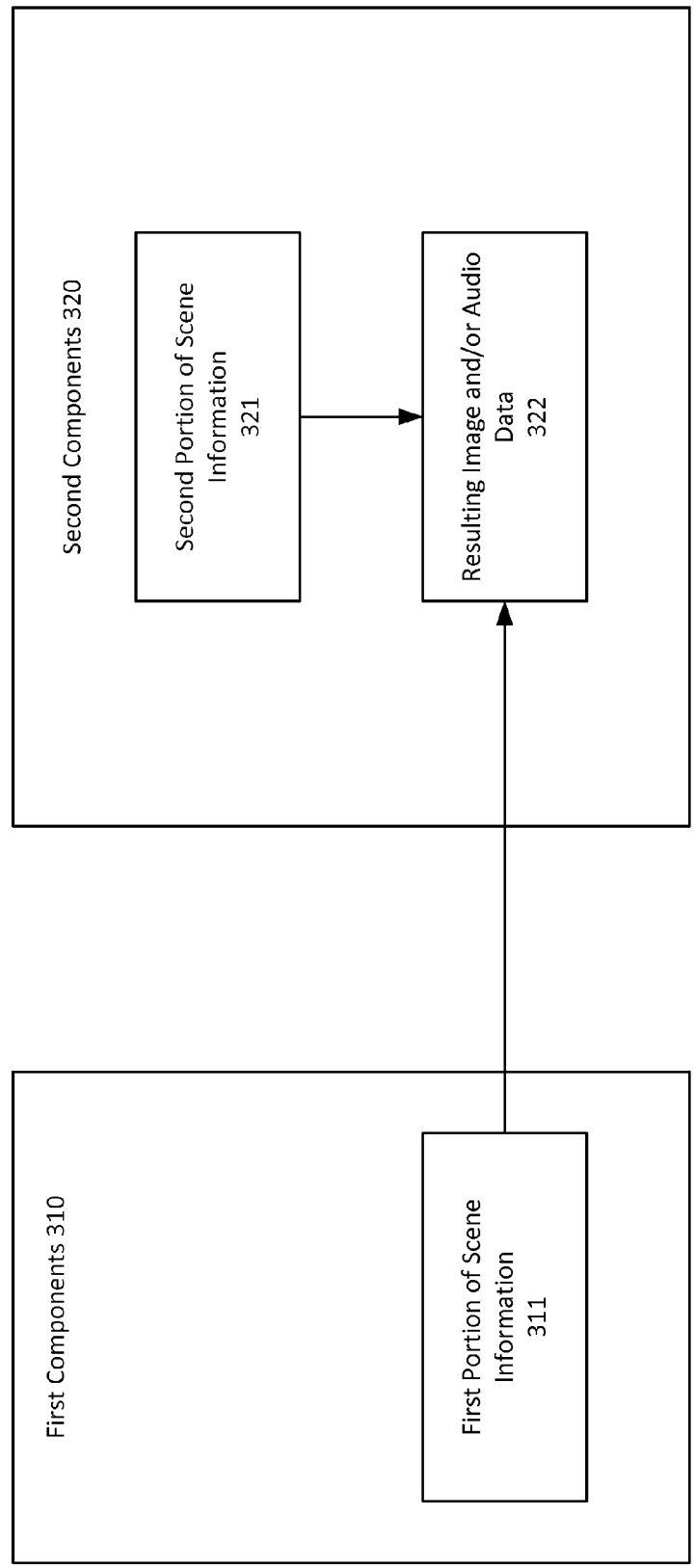
FIG. 3 is a diagram illustrating a first example scene rendering system that may be used in accordance with the present disclosure.

As set forth above, techniques for distributed determination of scene information are described herein. FIG. 3 is a diagram illustrating an example scene rendering system that may be used in accordance with the present disclosure. FIG. 3 includes one or more first components 310 in communication with one or more second components 320. In some cases, first components 310 and second components 320 may execute on different compute nodes. For example, in some cases, first components 310 may execute on one or more server compute nodes, while second components 320 may execute on one or more client compute nodes. The first components 310 and second components 320 may sometimes communicate using one or more communications networks including, for example, the Internet or other wide area networks (WANs) or local area networks (LANs). By contrast, in some cases, the first components 310 and second components 320 may execute together on a single node or on a group of the same or partially overlapping nodes.

As shown in FIG. 3, first components 310 determine a first portion of scene information 311, while second components 320 determine a second portion of scene information 321. The term scene information, as used herein, refers to information associated with a scene corresponding to a content item, such as a video game. A scene is data associated with a representation of at least a portion of a content item. A scene may, for example, include data associated with a three-dimensional representation of various objects. All, or any portion, of a scene may eventually be rendered into a two-dimensional image representation of the scene. Scene information may include, for example, information associated with geometries, lighting, colors, texture, shading, shadows, audio, camera attributes, and other information associated with a scene.

In some cases, the first portion of scene information 311 may be determined prior to an execution of a content item, while the second portion of scene information 312 may be determined during the execution of the content item. Also, in some cases, the first portion of scene information 311 may be determined based on characteristics of the scene that are not dependent upon user input, while the second portion of scene information 321 may be determined based on characteristics of the scene that are at least partially dependent upon user input.

Various techniques may be employed in order to enable both first components 310 and second components 320 to determine the respective portions of scene information 311 and 321. In one example scenario, both first components 310 and second components 320 may have access to one or more copies of a content item and/or any portion of code or other information associated with the content item. In some cases, first components 310 and second components 320 may have access to different copies and/or portions of copies of a content item and/or associated information. Also, in some cases, different versions of a content item and/or associated information may be generated, distributed, or otherwise made accessible to the first components 310 and the second components 320. In one particular example, a first version of a content item may be distributed and made accessible to the first components 310, while a second version of the content item may be distributed and made accessible to the second components 320.

In some cases, in advance of a particular playing of a content item, first components 310 may determine a first portion of scene information 311 for a variety of different scenes that may or may not actually be included within the particular playing of a content item. In some cases, a player may make a selection that causes a particular playing of a content item to branch into one of two available branches. For example, a player may select to turn left or to turn right at a particular intersection. Each available branch may have its own associated groups of scenes. In some cases, in advance of particular playing of a content item, first components 310 may determine a first portion of scene information 311 for both groups of scenes associated with both of the available branches. For example, in advance of particular playing of a content item, first components 310 may determine a first portion of scene information 311 for both scenes associated with a left turn and scenes associated with a right turn. This may allow the first portion of scene information 311 to be pre-determined regardless of which branch is selected by the player during gameplay.

As also shown in FIG. 3, at least part of the first portion of scene information 311 may be provided from the one or more first components 310 to the one or more second components 320. The one or more second components 320 may use the at least part of the first portion of scene information 310 in combination with at least part of the second portion of scene information 320 to generate resulting image and/or audio data 322. The resulting image and/or audio data 322 may include, for example, an image and/or audio corresponding to the scene. The resulting image and/or audio data 322 may be presented by components, such as a computer display, a monitor, speakers, and various other content presentation components. In some cases, the resulting image and/or audio data 322 may be presented by the same node on which the second components 320 are executed.

It is noted that the first portion of scene information 311 may sometimes be generated in multiple stages. In particular, in some cases, information associated with different objects, or portions of objects, in a scene may be generated in different stages. For example, a first stage could render water in the scene, a second stage could render clouds in the scene, and a third stage could render trees in the scene. Also, in some cases, different stages in the rendering process may be performed by different first components that optionally execute on different compute nodes and/or devices.

Figure 4:
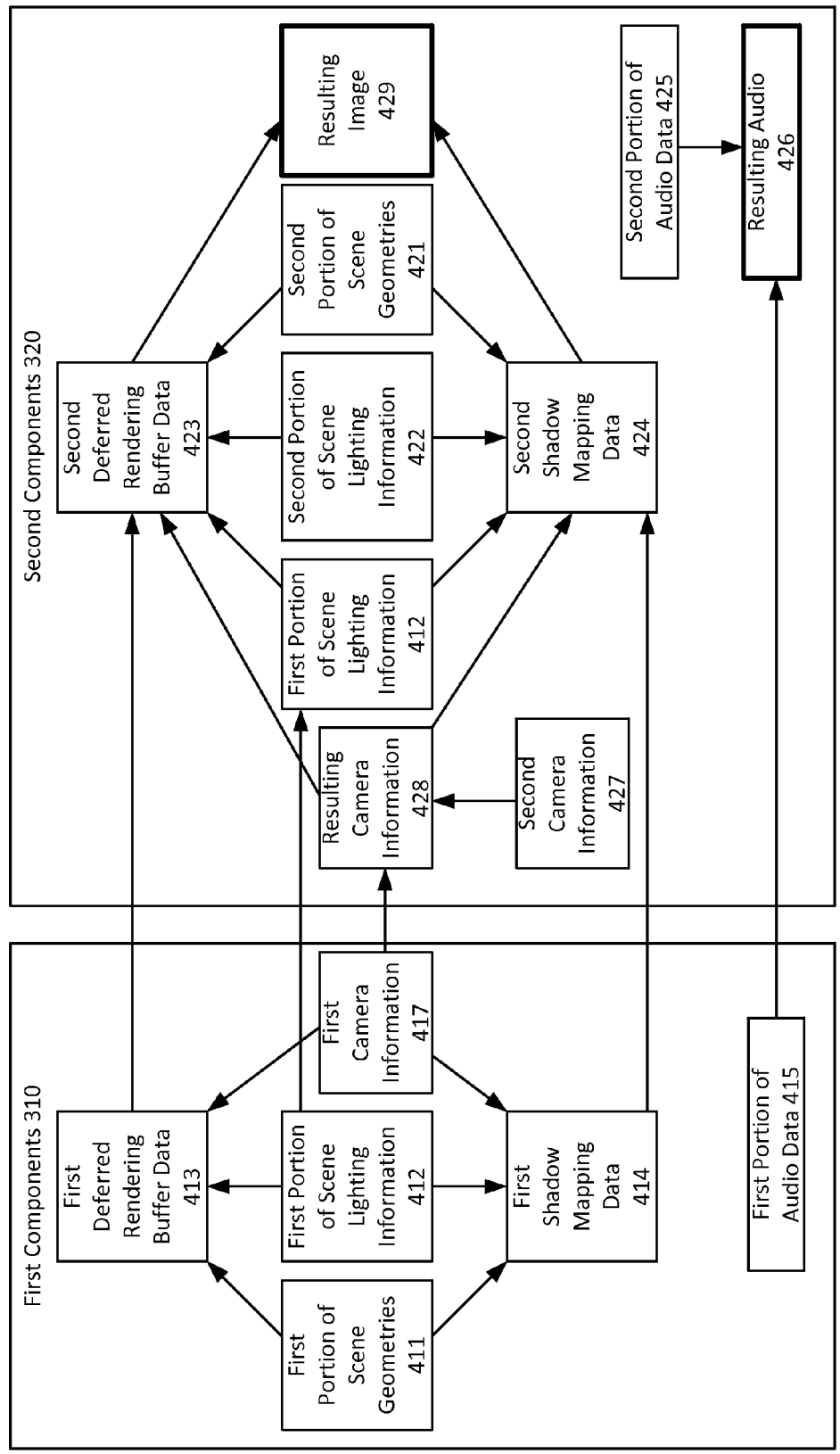
FIG. 4 is a diagram illustrating a second example scene rendering system that may be used in accordance with the present disclosure.

Some examples of the first portion of scene information 311 and the second portion of scene information 321, as well as various example techniques for determining, providing, and combining information portions 311 and 321, will now be described in detail. In particular, some examples of scene information that may be determined by first components 310 and second components 320 are shown in FIG. 4. Specifically, as shown in FIG. 4, first components 310 determine a first portion of scene geometries 411, while second components 420 determine a second portion of scene geometries 421. In some cases, the first portion of scene geometries 411 may be determined prior to an execution of a content item, while the second portion of scene geometries 421 may be determined during the execution of the content item. Also, in some cases, the first portion of scene geometries 411 may be determined based on characteristics of the scene that are not dependent upon user input, while the second portion of scene geometries 421 may be determined based on characteristics of the scene that are at least partially dependent upon user input.

As specific examples, a player of a video game may sometimes have control over certain objects within the video game, such as a particular character, weapon, and/or vehicle that is included within a scene of the video game. Accordingly, in some cases, it may not be possible to ascertain particular positions, motions, actions, or other features of these player-controlled objects in advance of the video game being played by the player. Thus, in some cases, geometries associated with player-controlled objects such as the particular character, weapon, and/or vehicle may be included in the second portion of scene geometries 421. By contrast, in some cases, a player may sometimes not have control over other objects within a scene, such as background objects, trees, water, clouds, buildings, furniture, walls, pictures, signs, and others. Accordingly, in some cases, it may be possible to ascertain particular positions, motions, actions, or other features of these non-player-controlled objects in advance of the video game being played by the player. Thus, in some cases, geometries associated with non-player-controlled objects may be included in the first portion of scene geometries 411.

As also shown in FIG. 4, first components 310 determine a first portion of scene lighting information 412, while second components 420 determine a second portion of scene lighting information 422. The first portion of scene lighting information 412 and the second portion of scene lighting information 422 may each include information associated with one or more scene light sources that may, for example, be applied to pixel properties computed based on scene geometries. In some cases, the first portion of scene lighting information 412 may be determined prior to playing of the content item, while the second portion of scene lighting information 422 may be determined during playing of the content item. Also, in some cases, the first portion of scene lighting information 412 may be determined based on characteristics of the scene that are not dependent upon user input, while the second portion of scene lighting information 422 may be determined based on characteristics of the scene that are at least partially dependent upon user input. For example, in some cases, features of certain light sources may be controlled by actions of a player. As a specific example, in some cases, a player may drive or otherwise control the operation of a car within a video game. The car may include headlights, which are light sources that emit light on to various other objects within the scene. In some cases, it may not be possible to ascertain particular positions and directions of the headlights in advance of the video game being played by the player. Thus, in some cases, lighting information corresponding to light emitted by the headlights may be included in the second portion of scene lighting information 422. By contrast, in some cases, a player may not have control over various other light sources associated with a scene, such as background lights, the sun, street lights, lights on signs, lights in rooms and buildings, and others. Accordingly, in some cases, it may be possible to ascertain particular positions, directions and other features of these non-player-controlled light sources in advance of the video game being played by the player. Thus, in some cases, lighting information corresponding to non-player-controlled light sources may be included in the first portion of scene lighting information 412.

As also shown in FIG. 4, first components 310 determine first camera information 417. In some cases, first camera information 417 may include a position of the camera with respect to the scene and/or various objects or portions of objects within the scene. First camera information 417 may also include information such as angle, direction, rotation, zoom, and other features associated with the camera.

First components 310 may determine first deferred rendering buffer data 413. The first deferred rendering buffer data 413 may be determined based, at least in part, on the first portion of scene geometries 411. Also, in some cases, the first deferred rendering buffer data 413 may be determined based, at least in part, on, the first portion of scene lighting information 412, the first camera information 417, and other portions of scene information that may be determined by first components 310, such as information associated with colors, texture, and shading. In some cases, the first deferred rendering buffer data 413 may be determined prior to an execution of a content item. Also, in some cases, the first deferred rendering buffer data 413 may be determined based on characteristics of the scene that are not dependent upon user input. As will be described in detail below, the first deferred rendering buffer data 413 may include, for example, data associated with a depth buffer, a normals buffer, and a color buffer. In some cases, the first deferred rendering buffer data 413 may be determined by performing various operations associated with vertex shading, geometry shading, and fragment shading Also, in some cases, first components 310 may apply the first portion of scene lighting information 412 to certain portions of the first deferred rendering buffer data 413. For example, in some cases, first components 310 may have access to information that identifies areas of the scene that are not expected to be modified by the second portion of scene geometries 421, and, in some cases, the first components 310 may apply the first portion of scene lighting information 412 to portions of the first deferred rendering buffer data 413 that correspond to these identified areas of the scene. One or more graphics processing units or rendering components may, for example, be employed to perform various operations associated with determining of first deferred rendering buffer data 413.

Deferred rendering is a phrase that is used herein to refer to techniques in which pixel properties are computed based, at least in part, on scene geometry information and are stored in an arrangement that is reusable with respect to different scene light sources. The computed pixel properties may be stored in various deferred rendering buffers, and the light sources may then be applied to the stored pixel properties within the deferred rendering buffers. The first portion of scene lighting information 412 and the second portion of scene lighting information 422 may each include information associated with one or more scene light sources that may be applied to the computed pixel properties.

First components 310 may also determine first shadow mapping data 414. The first shadow mapping data 414 may be determined based, at least in part, on the first portion of scene geometries 411. Also, in some cases, the first shadow mapping data 414 may also be determined based, at least in part, on the first portion of scene lighting information 412 and the first camera information 417. In some cases, the first shadow mapping data 414 may be determined prior to an execution of a content item. Also, in some cases, the first shadow mapping data 414 may be determined based on characteristics of the scene that are not dependent upon user input. The first shadow mapping data 414 may include, for example, sets of data each corresponding to a depth of surfaces with respect to a reference point of a light source associated with the scene. Each of these depths may eventually be compared to a depth of surfaces in the rendered scene to determine whether a corresponding pixel of other portion of an image should be shadowed. In some cases, first components 310 may apply the first portion of scene lighting information 412 to certain portions of the first shadow mapping data 414. For example, in some cases, first components 310 may have access to information that identifies areas of the scene that are not expected to be modified by the second portion of scene geometries 421, and, in some cases, the first components 310 may apply the first portion of scene lighting information 412 to portions of the first shadow mapping data 414 that correspond to these identified areas of the scene.

As also shown in FIG. 4, first components 310 may determine a first portion of audio data 415, while second components 420 determine a second portion of audio data 425. In some cases, the first portion of audio data 415 may be determined prior to an execution of the content item, while the second portion of audio data 425 may be determined during an execution of the content item. Also, in some cases, the first portion of audio data 415 may be determined based characteristics of the scene that are not dependent upon player input, while the second portion of audio data 425 may be determined based characteristics of the scene that are at least partially dependent upon player input. As a specific example, the first portion of audio data 415 may sometimes correspond to words that are spoken by a character that is controlled by the user, while the second the second portion of audio data 425 may sometimes correspond to background sounds, such as crowd noise, ocean waves, and the like.

As also shown in FIG. 4, first components 310 provide various different information to first components 320. In the particular example of FIG. 4, first components provide 310 provide first deferred rendering buffer data 413, first shadow mapping data 414, first portion of scene lighting information 412, first camera information 417, and first audio data 415 to second components 310. Thus, the above described information provided by first components 310 to second components 320, as depicted in FIG. 4, are examples of parts of the first portion of scene information 311 that are provided by first components 310 to second components 320, as depicted in FIG. 3.

As set forth above, in some cases, first components 310 and second components 320 may execute on different compute nodes that communicate over one or more networks. In some cases, information may, for example, be streamed in one or more information streams from first components 310 to second components 320. In these and other cases, a variety of different encoding techniques may be employed to enable efficient communication of information from first components 310 to second components 320. For example, in some cases, an H.264 encoding format may be employed to encode, in whole or in part, the information provided by first components 310 to second components 320. Additionally, in some examples, additional numbers of channels may be employed for transmission of scene information in comparison to mere transmission of red-green-blue (RGB) data or video data. For example, in some cases, while three channels may sometimes be employed for transmission of RGB data, eight or nine channels may be sometimes employed for transmission of scene information as described herein. Also, in some cases, different encoding or other transmission protocols or formats may be employed for transmission of different portions of scene information. For example, in some cases, it may be advantageous for depth buffer information to be transmitted with a higher precision than other scene information, such as color data. Accordingly, in some cases, depth buffer information may sometimes be transmitted using encoding or other transmission protocols or formats that require higher bandwidth usage but allow for more accurate transmission, while color data may be transmitted using encoding or other transmission protocols or formats that require lower bandwidth usage but are less accurate.

It is noted that, in some cases, a variety of timing schemes may be employed for transmitting information from first components 310 to second components 320 for different successive scenes of a content item. For example, in some cases, as a content item is being played, second components 320 may continually identify upcoming scenes and continually request information associated with the upcoming scenes from first components 310. Also, in some cases, information associated with one or more scenes may be transmitted from first components 310 to second components 320 prior to the identification of the occurrence of those scenes within the execution of the content item. The second components 320 may then store the received information for later use when the scenes are identified within the execution of the content item. This may be advantageous, for example, because it may reduce bandwidth that is required for transmitting scene information on-demand (i.e., with no or minimal advance notice).

Referring back to FIG. 4, it is seen that second components 320 may receive first camera information 417 and may also determine second camera information 427. In some cases, second camera information 427 may include adjustments to various camera features included within first camera information 417. For example, second camera information 427 may include adjustments to angle, direction, rotation, zoom, and other features associated with the camera. In one specific example, a player may choose to point a particular weapon with a slightly upwards angle or a slightly downwards angle, and the second camera information 427 may reflect this decision by causing a view of the scene to be accordingly rotated in a slightly upwards or slightly downwards direction. The second camera information 427 may be applied to and/or combined with the first camera information 417 in order to generate resulting camera information 428.

It is noted that, in some cases, the scene information provided first components 310 to second components 320 may sometimes correspond a larger view of the scene than that which is expected to actually be displayed to users. For example, in some cases, first deferred rendering buffer data 413 and/or first shadow mapping data 414 may sometimes correspond to a larger view of the scene than that which is expected to actually be displayed to users. Providing this expanded view information by first components 310 to second components 320 may, for example, allow second components 320 to rotate the camera angle in one or more directions using the additional provided data from first components 310. Thus, second components 320 may sometimes be capable of rotating the camera view in one or more directions and still generating a resulting image of the scene without requiring the first components 310 to alter, or to only minimally alter, the first deferred rendering buffer data 413 and/or first shadow mapping data 414. For example, a view of the scene to which first deferred rendering buffer data 413 and/or first shadow mapping data 414 correspond may sometimes be large enough to include views associated with both the example scenario in which a player points his weapon slightly upwards and the contrasting example scenario in the player points his weapon slightly downwards.

As also shown in FIG. 4, second components 320 may adjust the first deferred rendering buffer data 413 provided by first components 310 to generate second deferred rendering buffer data 423. In particular, the first deferred rendering buffer data 413 may be adjusted based, at least in part, on the second portion of scene geometries 421 to generate second deferred rendering buffer data 423. For example, in some cases, second components 320 may add the second portion of scene geometries 421 into the second deferred rendering buffer data 423 to combine the first portion of scene geometries 411 and the second portion of scene geometries 421 within the second deferred rendering buffer data 423. Operations associated with vertex shading, geometry shading, and fragment shading may also be performed on the second portion of scene geometries 421. In some cases, second components 320 may also generate the second deferred rendering buffer data 423 based, at least in part, on resulting camera information 428. For example, second components 320 may, at least in part, generate second deferred rendering buffer data 423 by using resulting camera information 428 to adjust camera features associated with first deferred rendering buffer data 413, such as the angle, direction, rotation, and zoom of the camera.

Second components 320 may also apply the first portion of scene lighting information 412 and the second portion of scene lighting information 422 to the second deferred rendering buffer data 423. In particular, second components 320 may, in some cases, apply the first portion of scene lighting information 412 and the second portion of scene lighting information 422 to both the first portion of scene geometries 411 and the second portion of scene geometries 421 within the second deferred rendering buffer data 423.

Second components 320 may also adjust the first shadow mapping data 414 provided by first components 310 to generate second shadow mapping data 424. In particular, the first shadow mapping data 414 may be adjusted based, at least in part, on the second portion of scene geometries 421 to generate the second shadow mapping data 424. For example, in some cases, second components 320 may add the second portion of scene geometries 421 into the second shadow mapping data 424 to combine the first portion of scene geometries 411 and the second portion of scene geometries 421 within the second shadow mapping data 424. In some cases, second components 320 may also generate the second deferred shadow mapping data 424 based, at least in part, on resulting camera information 428.

Second components 320 may also apply the first portion of scene lighting information 412 and the second portion of scene lighting information 422 to the second shadow mapping data 424. In particular, second components 320 may, in some cases, apply the first portion of scene lighting information 412 and the second portion of scene lighting information 422 to the first portion of scene geometries 411 and the second portion of scene geometries 421 within the second shadow mapping data 424.

It is noted, that, in some cases, the second portion of scene lighting need not necessarily be applied to second shadow mapping data 424. For example, in some cases, shadows corresponding to the second portion of lighting information may simply be omitted from a resulting image. Also, in some cases, second shadow mapping data 424 may be generated with a simplified geometry model of the scene.

In the example of FIG. 4, second components 320 may generate resulting image 429, or any portion of a resulting image, based, at least in part, on second deferred rendering buffer data 423 with the first and second portions of scene lighting information applied thereto and/or second shadow mapping data 424 with the first and second portions of scene lighting information applied thereto. As also shown, in FIG. 4, in addition to resulting image 429, the second components 320 may also generate resulting audio 426 associated with the scene. The resulting audio 426 may be generated by, for example, combining first portion of audio data 415 with second portion of audio data 425. In some cases, the resulting audio 426 may also be generated by editing or deleting certain features within first portion of audio data 415. For example, in some cases, if a player has moved a character further away from a source of audio within the scene, then the volume of the corresponding audio may be reduced. For example, if a character is moved away from a car, then a sound of the car engine may be reduced. By contrast, if a player has moved a character closer to a source of audio within the scene, then the volume of the corresponding audio may be increased.

In addition to the elements specifically depicted in FIG. 4, other information may also be used to generate resulting image 429 associated with the scene. For example, in some cases, one or more transparent objects may be included in the scene and may be at least partially depicted in the resulting image 429. In some cases, the second components 320 may render the transparent objects and combine the transparent objects with other resulting image data. The transparent objects may, for example, be combined with resulting image data after the scene lighting information has been applied to the second deferred rendering buffer data 423 and/or second shadow mapping data 424.

It is noted, however, that the first components 310 may sometimes also be used to render certain transparent objects. For example, in some cases, first components 310 may be employed to render transparent objects that are positioned in areas of the scene that are not expected to be modified by the second portion of scene geometries 421. As should be appreciated, in cases when the first components 310 render one or more transparent objects, the rendered transparent objects may be included in the scene information provided by the first components 310 to the second components 320.

Figure 5:
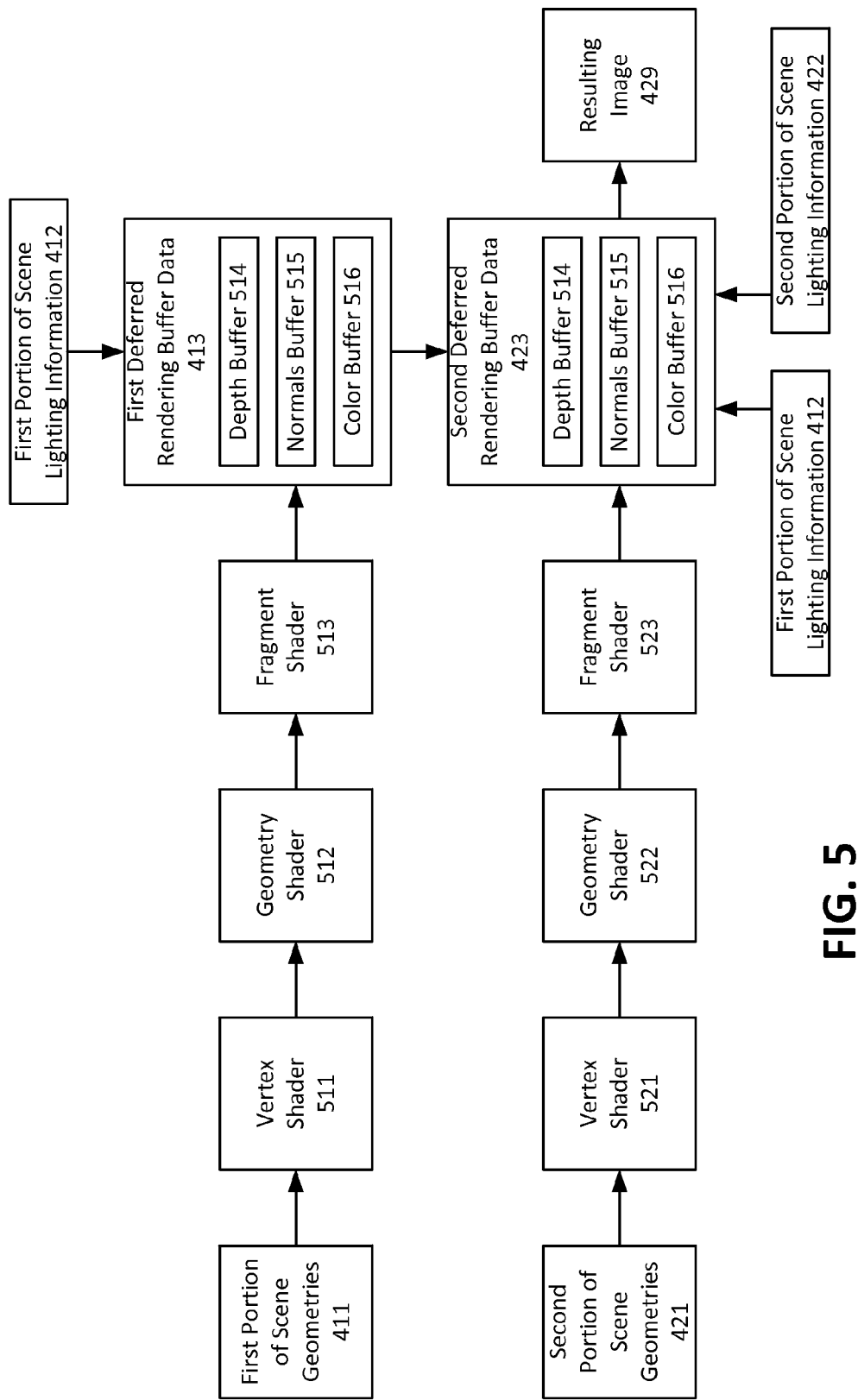
FIG. 5 is a diagram illustrating example system for determination and adjustment of deferred rendering buffer data.

As set forth above, first deferred rendering buffer data 413 may be determined by first components 310 and provided to second components 320, which may perform various adjustments in order to determine second deferred rendering buffer data 423. Referring now to FIG. 5, some example techniques for determination and adjustment of deferred rendering buffer data will now be described in detail. In particular, the first portion of scene geometries 411 may be passed through a series of shading components including vertex shader 511, geometry shader 512, and fragment shader 513. As should be appreciated, it is not required that shaders 511, 512, and 513 necessarily be distinct and/or different components and may simply be associated with different operations performed by one or more of the same components. Vertex shader 511 may perform operations such as transforming positions of vertices in three-dimensional space into corresponding positions in two-dimensional space and generating associated depth values. Geometry shader 512 may perform operations, such as generating additional geometric primitives, for improved depiction of geometric features. Fragment shader 513, which may also be referred to as a pixel shader, may perform operations such as computing various attributes of individual fragments and/or pixels. The resulting data from shaders 511, 512, and 513 is then passed to a set of buffers including depth buffer 514, normals buffer 515, color buffer 516, which may include data associated with depth, normals, and color, respectively, for various pixels. These buffers may, for example, be implemented using multiple respective rendering targets. In some cases, the first portion of scene lighting information 412 may be applied to certain portions of the data in the depth buffer 514, normals buffer 515, and color buffer 516. For example, in some cases, the first portion of scene lighting information 412 may be applied to portions of the data in the depth buffer 514, normals buffer 515, and color buffer 516 that correspond to areas of the scene that are not expected to be modified by the second portion of scene geometries 421. The first deferred rendering buffer data 413 may then be provided to second components 320.

Second components 320 may then pass the second portion of scene geometries 421 through a series of shading components including vertex shader 521, geometry shader 522, and fragment shader 523. The resulting data from shaders 521, 522, and 523 may then be added to the data associated with depth buffer 514, normals buffer 515, color buffer 516 as included in the first deferred rendering buffer data 413. The resulting data may be included in second deferred rendering buffer data 423. Additionally, in some cases, first portion of scene lighting information 412 and the second portion of scene lighting information 422 may be applied to data associated with buffers 514, 515, and 516. The second deferred rendering buffer data 423 with the first and the second portions of scene lighting information 412 and 422 applied thereto may then be used to generate resulting image 426.

Deferred rendering buffers is a phrase that is used herein to refer to buffers associated with deferred rendering or similar or derivative techniques. Similarly, deferred rendering buffer data is a phrase that is used herein to refer to data corresponding to one or more deferred rendering buffers. By way of example and not limitation, there are three deferred rendering buffers (i.e., depth buffer 514, normals buffer 515, and color buffer 516) depicted in the particular example of FIG. 5. It is noted the claimed techniques are not limited to use with the particular example deferred rendering buffers depicted in FIG. 5, and any number of additional or alternative deferred rendering buffers may be employed, such as a specular buffer, an emissive buffer, a glossiness buffer, a roughness buffer, and other buffers.

Figure 6:
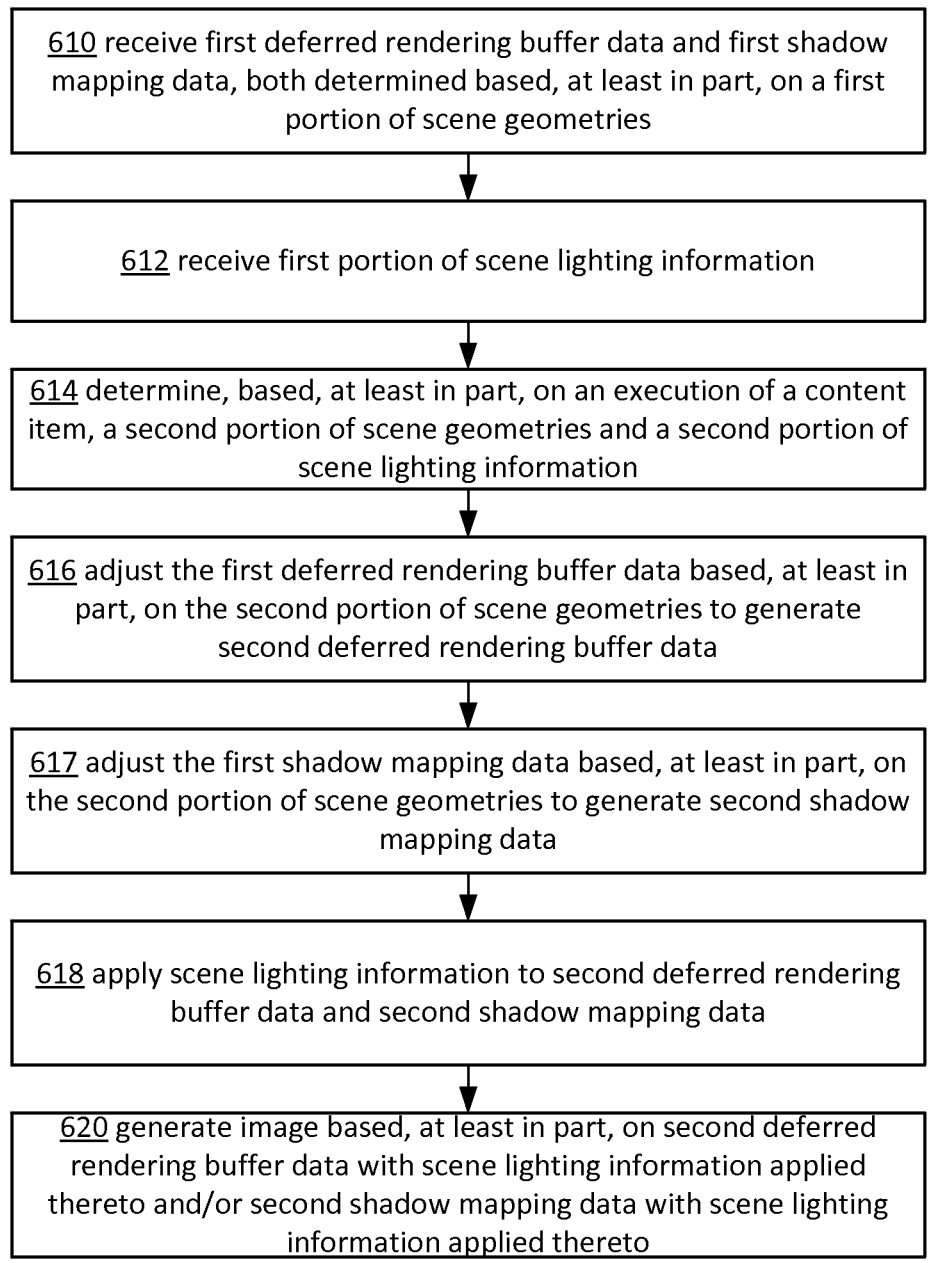
FIG. 6 is a flowchart depicting an example process for generation of an image.

An example process for generation of an image will now be described in detail with reference to FIG. 6. As shown in FIG. 6, at operation 610, the first deferred rendering buffer data and the first shadow mapping data are received. As set forth above, the first deferred rendering buffer data and the first shadow mapping data may be received by, for example, second components 320 of FIG. 4. The first deferred rendering buffer data and the first shadow mapping data may be determined and provided by, for example, first components 310 of FIG. 4. In the example of FIG. 6, the first deferred rendering buffer data and the first shadow mapping data are both determined based, at least in part, on a first portion of scene geometries. In some cases, the first deferred rendering buffer data and the first shadow mapping data may both also be determined based, at least in part, on a first portion of scene lighting information and first camera information. As also set forth above, in some cases, the first portion of scene geometries, the first portion of scene lighting information, the first camera information, the first deferred rendering buffer data, and the first shadow mapping data may be determined prior to an execution of the content item. Also, in some cases, the first portion of scene geometries, the first portion of scene lighting information, the first camera information, the first deferred rendering buffer data, and the first shadow mapping data may be determined based on characteristics of the scene that are not dependent upon player input.

It is noted that some example techniques for determination of the first deferred rendering buffer and the first shadow mapping data are set forth in detail above and are not repeated here. It is also noted that some example techniques for transmitting the first deferred rendering buffer data and the first shadow mapping data from the first components 310 to the second components 320, such as some example encoding techniques, are set forth in detail above and are not repeated here.

At operation 612, the first portion of scene lighting information is received. As set forth above, the first portion of scene lighting information and the first camera information may be received by, for example, second components 320 of FIG. 4. As set forth above, the first portion of camera information may also sometimes be received by, for example, second components 320 of FIG. 4. The first portion of scene lighting information and the first camera information may be determined and provided by, for example, first components 310 of FIG. 4. In some cases, the first portion of scene lighting information and the first camera information may be streamed by first components 310 to second components 320 along with the first deferred rendering buffer data and the first shadow mapping data received at operation 610.

At operation 614, a second portion of scene geometries and a second portion of scene lighting information are determined based, at least in part, on an execution of a content item. As set forth above, a second portion of camera information may also sometimes be determined based, at least in part, on the execution of the content item. The second portion of scene geometries, second portion of scene lighting information, and second camera information may be determined by, for example, second components 320 of FIG. 4. As set forth above, in some cases, the second portion of scene geometries, the second portion of scene lighting information, and the second camera information may be determined based on characteristics of the scene that are at least partially dependent upon player input.

At operation 616, the first deferred rendering buffer data is adjusted based, at least in part, on the second portion of scene geometries to generate second deferred rendering buffer data. For example, in some cases, the second portion of scene geometries may be inserted into the first deferred rendering buffer data and combined with the first portion of scene geometries in order to generate the second deferred rendering buffer data. Additionally, in some cases, the second deferred rendering buffer data may be generated based, at least in part, on second camera information. The second camera information may include adjustments to camera features within the first camera information, such as adjustments to angle, direction, rotation, and zoom associated with the camera. The first deferred rendering buffer data may be adjusted based on these camera adjustments as set forth in detail above.

At operation 617, the first shadow mapping data is adjusted based, at least in part, on the second portion of scene geometries to generate second shadow mapping data. For example, in some cases, the second portion of scene geometries may be inserted into the first shadow mapping data and combined with the first portion of scene geometries in order to generate the second shadow mapping data. Additionally, in some cases, the second deferred rendering buffer data may be generated based, at least in part, on second camera information.

At operation 618, scene lighting information is applied to the second deferred rendering buffer data and the second shadow mapping data. For example, in some cases, the first portion of scene lighting information and the second portion of scene lighting information may be applied to the first and the second portions of scene geometries within the second deferred rendering buffer data and the first and the second portions of scene geometries within the second shadow mapping data.

At operation 620, an image is generated based, at least in part, on the second deferred rendering buffer data with the scene lighting information applied thereto and/or the second shadow mapping data with the scene lighting information applied thereto.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for generating an image of a scene associated with an execution of a video game comprising:
one or more server compute nodes comprising one or more memories and one or more processors and operable to perform operations comprising:
determining a first portion of scene geometries associated with one or more objects not controlled by a player, a first portion of scene lighting information, and first data corresponding to deferred rendering buffers, wherein the first data corresponding to the deferred rendering buffers is determined based, at least in part, on the first portion of the scene geometries associated with the one or more objects not controlled by the player; and
transmitting the first data corresponding to the deferred rendering buffers and the first portion of the scene lighting information to one or more client compute nodes; and
the one or more client compute nodes comprising one or more memories and one or more processors and operable to perform operations comprising:

receiving the first data corresponding to the deferred rendering buffers and the first portion of the scene lighting information from the one or more server compute nodes;

determining, based, at least in part, on the execution of the video game, a second portion of the scene geometries associated with one or more objects controlled by the player and a second portion of the scene lighting information;

adjusting the first data corresponding to the deferred rendering buffers based, at least in part, on the second portion of the scene geometries associated with the one or more objects controlled by the player to generate second data corresponding to the deferred rendering buffers;

applying the first and the second portions of the scene lighting information to the second data corresponding to the deferred rendering buffers; and generating the image of the scene based, at least in part, on the second data corresponding to the deferred rendering buffers with the first and the second portions of the scene lighting information applied thereto.

2. The system of claim 1, wherein the one or more server compute nodes are operable to determine the first data corresponding to the deferred rendering buffers prior to the execution of the video game.

3. The system of claim 1, wherein:
the one or more server compute nodes are operable to perform further operations comprising:
determining first data corresponding to shadow mapping based, at least in part, on the first portion of the scene geometries; and
transmitting the first data corresponding to the shadow mapping to the one or more client compute nodes; and
the one or more client compute nodes are operable to perform further operations comprising:
receiving the first data corresponding to the shadow mapping from the one or more server compute nodes;
adjusting the first data corresponding to the shadow mapping based on the second portion of the scene geometries to generate second data corresponding to the shadow mapping; and
applying the first and second portions of the scene lighting information to the second data corresponding to the shadow mapping, wherein the image of the scene is generated further based, at least in part, on the second data corresponding to the shadow mapping with the first and the second portions of the scene lighting information applied thereto.

4. The system of claim 3, wherein the one or more server compute nodes are operable to determine the first data corresponding to the shadow mapping prior to the execution of the video game.

5. A computer-implemented method for generating an image of a scene associated with an execution of a content item comprising:
receiving first data corresponding to deferred rendering buffers, wherein the first data corresponding to the deferred rendering buffers is determined based, at least in part, on a first portion of scene geometries associated with one or more objects not controlled by a player;

determining, based, at least in part, on the execution of the content item, a second portion of the scene geometries associated with one or more objects controlled by the player;

adjusting the first data corresponding to the deferred rendering buffers based, at least in part, on the second portion of the scene geometries associated with the one or more objects controlled by the player to generate second data corresponding to the deferred rendering buffers;

applying scene lighting information to the second data corresponding to the deferred rendering buffers; and generating the image of the scene based, at least in part, on the second data corresponding to the deferred rendering buffers with the scene lighting information applied thereto.

6. The computer-implemented method of claim 5, wherein the first data corresponding to the deferred rendering buffers is determined in advance of the execution of the content item.

7. The computer-implemented method of claim 5, further comprising:
receiving a first portion of the scene lighting information determined in advance of the execution of the content item; and
determining, based, at least in part, on the execution of the content item, a second portion of the scene lighting information,
wherein applying the scene lighting information to the second data corresponding to the deferred rendering buffers comprises applying the first portion and the second portion of the scene lighting information to the first portion and the second portion of the scene geometries.

8. The computer-implemented method of claim 5, further comprising:
receiving first data corresponding to shadow mapping, wherein the first data corresponding to the shadow mapping is determined based, at least in part, on the first portion of the scene geometries;
adjusting the first data corresponding to the shadow mapping based, at least in part, on the second portion of the scene geometries to generate second data corresponding to the shadow mapping; and
applying the scene lighting information to the second data corresponding to the shadow mapping,
wherein the image of the scene is generated further based, at least in part, on the second data corresponding to the shadow mapping with the scene lighting information applied thereto.

9. The computer-implemented method of claim 8, wherein the first data corresponding to the shadow mapping is determined in advance of the execution of the content item.

10. The computer-implemented method of claim 8, further comprising:
receiving a first portion of the scene lighting information determined in advance of the execution of the content item; and
determining, based, at least in part, on the execution of the content item, a second portion of the scene lighting information,
wherein applying the scene lighting information to the second data corresponding to the shadow mapping comprises applying the first portion and the second portion of the scene lighting information to the first portion and the second portion of the scene geometries.

11. The computer-implemented method of claim 5, further comprising:
- receiving a first portion of audio data associated with the scene;
- determining, based, at least in part, on the execution of the content item, a second portion of the audio data associated with the scene;
- combining the first and the second portions of the audio data into resulting audio data associated with the scene; and
- playing the resulting audio data.

12. The computer-implemented method of claim 5, wherein the deferred rendering buffers comprise at least one of a depth buffer, a normals buffer, a color buffer, a specular buffer, an emissive buffer, a glossiness buffer or a roughness buffer.

13. One or more non-transitory computer-readable storage media having stored thereon instructions that, upon execution on one or more compute nodes, cause the one or more compute nodes to perform operations comprising:
- receiving first data corresponding to deferred rendering buffers, wherein the first data corresponding to the deferred rendering buffers is determined based, at least in part, on a first portion of scene geometries associated with one or more objects not controlled by a player;
- determining, based, at least in part, on an execution of a content item, a second portion of the scene geometries associated with one or more objects controlled by the player;
- adjusting the first data corresponding to the deferred rendering buffers based on the second portion of the scene geometries associated with the one or more objects controlled by the player to generate second data corresponding to the deferred rendering buffers;
- applying scene lighting information to the second data corresponding to the deferred rendering buffers; and
- generating an image of the scene based, at least in part, on the second data corresponding to the deferred rendering buffers with the scene lighting information applied thereto.

14. The one or more non-transitory computer-readable storage media of claim 13, wherein the first data corresponding to the deferred rendering buffers is determined in advance of the execution of the content item.

15. The one or more non-transitory computer-readable storage media of claim 13, further comprising:
- receiving a first portion of the scene lighting information determined in advance of the execution of the content item; and
- determining, based, at least in part, on the execution of the content item, a second portion of the scene lighting information,
- wherein applying the scene lighting information to the second data corresponding to the deferred rendering buffers comprises applying the first portion and the second portion of the scene lighting information to the first portion and the second portion of the scene geometries.

16. The one or more non-transitory computer-readable storage media of claim 13, wherein the operations further comprise:
- receiving first data corresponding to shadow mapping, wherein the first data corresponding to the shadow mapping is determined based, at least in part, on the first portion of the scene geometries;
- adjusting the first data corresponding to the shadow mapping based on the second portion of the scene geometries to generate second data corresponding to the shadow mapping; and
- applying the scene lighting information to the second data corresponding to the shadow mapping,
- wherein the image of the scene is generated further based, at least in part, on the second data corresponding to the shadow mapping with the scene lighting information applied thereto.

17. The one or more non-transitory computer-readable storage media of claim 16, wherein the first data corresponding to the shadow mapping is determined in advance of the execution of the content item.

18. The one or more non-transitory computer-readable storage media of claim 16, further comprising:
- receiving a first portion of the scene lighting information determined in advance of the execution of the content item; and
- determining, based, at least in part, on the execution of the content item, a second portion of the scene lighting information
- wherein applying the scene lighting information to the second data corresponding to the shadow mapping comprises applying the first portion and the second portion of the scene lighting information to the first portion and the second portion of the scene geometries.

19. The one or more non-transitory computer-readable storage media of claim 13, wherein the operations further comprise:
- receiving a first portion of audio data associated with the scene;
- determining, based, at least in part, on the execution of the content item, a second portion of the audio data associated with the scene;
- combining the first and the second portions of the audio data into resulting audio data associated with the scene; and
- playing the resulting audio data.

20. The one or more non-transitory computer-readable storage media of claim 13, wherein the deferred rendering buffers comprise at least one of a depth buffer, a normals buffer, a color buffer, a specular buffer, an emissive buffer, a glossiness buffer or a roughness buffer.

* * * * *